United States Patent
Schyr et al.

(10) Patent No.: US 11,397,136 B2
(45) Date of Patent: Jul. 26, 2022

(54) MODULAR TEST BENCH FOR ROADWORTHY COMPLETE VEHICLES

(71) Applicant: AVL LIST GMBH, Graz (AT)

(72) Inventors: Christian Schyr, Heidelberg (DE); Tobias Düser, Bensheim (DE); Thomas Reinhold Weck, Hadamar (DE); Bernhard Schick, Waltenhofen (DE)

(73) Assignee: AVL List GmbH, Graz (AT)

( * ) Notice: Subject to any disclaimer, the term of this patent is extended or adjusted under 35 U.S.C. 154(b) by 506 days.

(21) Appl. No.: 16/330,659

(22) PCT Filed: Sep. 7, 2017

(86) PCT No.: PCT/EP2017/072490
§ 371 (c)(1),
(2) Date: Mar. 5, 2019

(87) PCT Pub. No.: WO2018/046609
PCT Pub. Date: Mar. 15, 2018

(65) Prior Publication Data
US 2019/0225235 A1    Jul. 25, 2019

(30) Foreign Application Priority Data

Sep. 12, 2016   (AT) .............................. A 50809/2016

(51) Int. Cl.
*G01M 17/007*   (2006.01)
*B60W 50/04*   (2006.01)
*B60W 50/00*   (2006.01)

(52) U.S. Cl.
CPC .......... *G01M 17/007* (2013.01); *B60W 50/04* (2013.01); *B60W 2050/0028* (2013.01)

(58) Field of Classification Search
CPC ............... G01M 17/007; B60W 50/04; B60W 2050/0028
See application file for complete search history.

(56) References Cited

U.S. PATENT DOCUMENTS 5,700,951 A    12/1997  Sagiyama et al.
2007/0260438 A1    11/2007  Langer et al.
(Continued)

FOREIGN PATENT DOCUMENTS

CN         1877284 A   * 12/2006
CN       200941083 Y   *  8/2007
(Continued)

*Primary Examiner* — Aniss Chad
*Assistant Examiner* — Christopher George Fees
(74) *Attorney, Agent, or Firm* — Dykema Gossett PLLC

(57) ABSTRACT

A steering force module on a vehicle test bench including a first main body and a transverse force actuator that is displaceable relative thereto. A transverse force being generated by a displacement of the transverse force actuator relative to the first main body, by means of which the transverse force can be applied to the steering system. Furthermore, a drivetrain module is present which consists of a second main body and a drive actuator that is rotatable relative thereto, the drive actuator being rotationally fixable by means of a second mechanical interface to a drive axle of the drivetrain, a torque that is independent of the transverse force being generated by a rotation of the drive actuator relative to the second main body is applied to the drive axle.

11 Claims, 2 Drawing Sheets

(56) References Cited

U.S. PATENT DOCUMENTS

2013/0025355 A1 1/2013 Inhoff et al.
2013/0030720 A1 1/2013 Schulte et al.

FOREIGN PATENT DOCUMENTS

| CN | 101696908 | A | * | 4/2010 | |
|----|-----------|---|---|--------|--|
| CN | 101696908 | A | | 4/2010 | |
| DE | 19910967 | C1 | * | 9/2000 | ........... B60C 99/006 |
| DE | 102006016764 | A1 | | 10/2007 | |
| DE | 102014224240 | A1 | * | 6/2016 | ................ B66F 7/28 |
| EP | 1596179 | A2 | | 11/2005 | |
| EP | 1760446 | A2 | | 3/2007 | |
| EP | 2602602 | A1 | * | 6/2013 | ........ G01M 17/0074 |
| EP | 2602602 | A1 | | 6/2013 | |
| JP | H10045011 | A | | 2/1998 | |

* cited by examiner

MODULAR TEST BENCH FOR
ROADWORTHY COMPLETE VEHICLES

CROSS-REFERENCE TO RELATED APPLICATIONS

This application is a national stage filing based upon International PCT Application No. PCT/EP2017/072490, filed 7 Sep. 2017, which claims the benefit of priority to Austria application No. A50809/2016, filed 12 Sep. 2016, the disclosures of which are incorporated herein by reference.

BACKGROUND

The present invention relates to a vehicle test bench for applying forces to a roadworthy complete vehicle that comprises a steering system and a drivetrain, and to the use of the vehicle test bench.

In order to test driver assistance systems, such as antilock braking systems, cruise control, lane assist, stabilization systems, etc., of a roadworthy complete vehicle, it is possible to simulate vehicle movements in a virtual environment having comprehensive road and traffic models. For this purpose, sensors installed in the vehicle (ultrasonic sensors, cameras, radars, GPS trackers, etc.), as well as in-vehicle communication devices or communication protocols, both car-to-car (C2C) and infrastructure-to-car (I2C), are connected to a simulation platform and emulated or simulated. In addition, it is desirable to operate the vehicle under the same energetic conditions as in a real road test. This allows safety-critical driving maneuvers to be incorporated into the simulation under reproducible conditions, including human interaction. The vehicle or a part thereof, for example a drivetrain, is set up and operated on a test bench as real hardware. The vehicle on the test bench is then subjected to the forces, torques, etc. calculated in the simulation by means of suitable actuators such that the vehicle, which is arranged so as to be stationary on the test bench, experiences the same driving conditions as the virtual vehicle in the simulation. For this purpose, forces and/or torques therefore have to be applied to the vehicle, in particular to the drivetrain and the steering system.

In principle, known test bench arrangements could be used to apply forces to the vehicle. For example, EP 1 596 179 A2 describes a vehicle-function test bench in which loading devices are attached to the wheels, wheel flanges or wheel hubs, the loading devices being designed to be movable in order to be able to at least partly follow steering movements. This would allow a dynamic application of forces in the drivetrain.

DE 20 2011 050 806 U1 describes a remote-controlled test bench for controlling a steering control unit. For this purpose, a steering torque and a steering angle are measured on a steering apparatus and steering speeds and forces which occur are analyzed. DE 10 2006 016 764 A1 also describes a similar method for testing the steering system of a motor vehicle.

A steering system test bench or drivetrain test bench are not suitable for testing driver assistance systems, however, because only one force is applied to the drivetrain or steering system in each case. In addition, these test benches are generally not intended for roadworthy complete vehicles.

Test benches which take both drive torques and steering torques into account are also known. Although these test benches are suitable for roadworthy complete vehicles, they are mainly used for quality control at the end of vehicle production, which is why they have limited dynamics and are unsuitable for test bench applications. EP 1 760 446 A2 discloses a vehicle test bench of this kind in which two translational and one rotational degree of freedom are applied directly to the wheels, wheel flanges or wheel hubs. Since a highly dynamic connection is required for the simulation of realistic traffic scenarios, systems of this kind are also unsuitable for testing driver assistance systems.

SUMMARY OF THE INVENTION

The problem addressed by the present invention is therefore that of providing a highly dynamic test bench arrangement which makes it possible to simulate realistic traffic scenarios and thus to test driver assistance systems of a roadworthy complete vehicle.

This problem is solved according to the invention by a vehicle test bench on which a steering force module is present which consists of a first main body and a transverse force actuator that is displaceable relative thereto, the transverse force actuator being connectable by means of a first mechanical interface to an unhooked tie rod of the steering system, and the first main body being mechanically connectable to a first fixed mounting point, a transverse force being generated by a displacement of the transverse force actuator relative to the first main body, by means of which the transverse force can be applied to the steering system. Furthermore, a drivetrain module is present which consists of a second main body and a drive actuator that is rotatable relative thereto, the drive actuator being rotationally fixable by means of a second mechanical interface to a drive axle of the drivetrain, and the second main body being mechanically connectable to a second fixed mounting point, a torque that is independent of the transverse force being generated by a rotation of the drive actuator relative to the second main body, by means of which the torque can be applied to the drive axle.

The vehicle test bench according to the invention thus constitutes a highly dynamic test bench which allows the application of highly dynamic forces and accelerations to the roadworthy complete vehicle. In contrast, there would be no dynamic application of forces on a stationary test bench. On the other hand, on a transient test bench, stationary and also low-dynamic forces and accelerations would be applied to a roadworthy complete vehicle. Low-dynamic forces and accelerations have gradients that are lower than usually occur in a normal driving operation, e.g. a constant acceleration of the vehicle from 0 to 100 km/h over 30 seconds—meaning a realistic driving operation could not be simulated. In contrast, highly dynamic forces and movements, the application of which is permitted by the test bench according to the invention, have such high gradients as are possible in a real driving operation. This involves the simulation of e.g. slipping wheels, skid maneuvers, slalom travel, etc.

A roadworthy complete vehicle is understood to mean a vehicle that is approved for public transport. Of course, a roadworthy complete vehicle has to be fastened to the test bench by means of hooks, screws, chains, etc. Rods are usually necessary for fastening to highly dynamic test benches because they are stiffer than fastening with chains and thus can also withstand the high dynamics of the applied forces. Adapters are often required on the wheel hub; the wheels can also be removed. Mechanical modifications which can easily be added or removed by a mechanic as part of a workshop test—e.g. unhooking a tie rod—are also possible. The complete vehicle thus remains roadworthy so long as an intervention does not require a new roadworthiness test or a subsequent inspection by a designated authority, e.g. the TÜV [Technical Inspection Association]. Monitoring buses or introducing signals onto buses, such as a CAN bus, is therefore also allowed. A permanent modification to the roadworthy complete vehicle, i.e. for example a modification to a bus that cannot be reversed by workshop mechanics, i.e. resulting in the vehicle losing its roadworthiness, is not permitted however.

Due to the fact that the tie rod of the roadworthy complete vehicle is unhooked, forces or torques can be applied to the drivetrain and the steering system individually. A structural separation of the steering force module of the drivetrain module makes it possible for the longitudinal dynamics acting on the complete vehicle, or the steering system and the drivetrain of the complete vehicle, and the transverse dynamics to also be decoupled on the test bench side. The longitudinal dynamics are applied to the drivetrain by means of the highly dynamic drive actuator, and the transverse dynamics are applied to the steering system by means of the highly dynamic transverse force actuator via the tie rod. Thus, both higher longitudinal dynamics and higher transverse dynamics can be achieved than would be possible in systems in which the drive actuator and the transverse force actuator are coupled. Therefore, a simulation of a vehicle under the same energetic conditions as in a real road test and thus a realistic test of driver assistance systems is possible.

The vehicle test bench according to the invention can also include a second steering force module which consists of a third main body and a further transversely displaceable transverse force actuator, the further transverse force actuator being connectable by means of a third mechanical interface to the unhooked tie rod of the steering system, and the third main body being connectable to a third fixed mounting point, a further transverse force being generated by a displacement of the further transverse force actuator relative to the third main body, by means of which the further transverse force can be applied to the steering system. This makes it possible to allow different transverse forces to act on the left and the right-hand side of the tie rod, for example. Of course, the same transverse force can be applied in each case at different points on the tie rod to achieve for example uniform force loading, in particular of existing bearings.

The vehicle test bench according to the invention may also include a further drivetrain module which consists of a fourth main body and a further axially rotatable drive actuator, the further drive actuator being connectable by means of a fourth mechanical interface to the drivetrain of the vehicle, and the fourth main body being connectable to a fourth fixed mounting point, a further torque that is independent of the transverse force being generated by a rotation of the further drive actuator relative to the fourth main body, by means of which the further torque can be applied to the drivetrain. This makes it possible to allow different torques or also the same torque to act on the left and the right-hand side of the drive axle of the drivetrain, for example. This may be necessary in particular if the left and the right drive axle are not rigidly connected, i.e. no potential barrier is activated.

The first fixed mounting point and/or the second fixed mounting point and/or the third fixed mounting point and/or the fourth fixed mounting point may each be located on the test bench or also on the complete vehicle. The first and second and, if present, the third and/or the fourth main body can of course also be directly connected or also identical. Quick-action coupling systems for rapidly mounting and removing the roadworthy complete vehicle on the performance test bench can be used both for the mechanical interfaces and for the mounting points.

It is also possible for an existing torque module to be retrofitted with a steering force module in order to form a vehicle test bench according to the invention. For example, a torque module is already present as part of a drivetrain test bench in the form of load machines. These load machines have a moment of inertia corresponding to the real wheel. Of course, the use of a drivetrain test bench as a torque module is only possible if the existing load machines meet the highly dynamic requirements. In drivetrain test benches, the load machines are connected to the wheel hubs or wheel flanges of the vehicle, or to adapter discs attached thereto, and allow a realistic tire slip simulation during the original use. Displacement devices which allow adaption to different vehicle dimensions are often present for the load machines. The vehicle chassis is generally supported vertically by special bearing modules which are designed so as to be able to rotate about the longitudinal axis and allow a realistic deflection of the vehicle in the idle position. In addition, a lift truck is usually provided for mounting and removing the vehicle on the test bench.

A torque module may also be present on a roller test bench for example. A roller test bench comprises rollers having displaceable covers in the longitudinal and transverse direction. The vehicle is fastened to the rollers by chains or by rods, as a result of which a torque is applied by means of the rollers to the wheels of the vehicle and subsequently to the drivetrain. The fact that the highly dynamic requirements have to be met also applies to the use of a drivetrain test bench as a torque module.

For the attachment of the steering force module, for example an existing free installation space in the front region of the vehicle on the drivetrain test bench or roller test bench can be used. It is of course important to ensure that both existing blowers and the steering force module do not produce any interference or incorrect detections for a radar emulator mounted in the front region of the vehicle. A steering force module according to the invention can be mounted on a drivetrain test bench, roller test bench or the like by a mechanic within 30 minutes. Preferably, the steering force module can also be mounted outside the test chamber, e.g. on a lifting platform.

Power electronics which supply power to the vehicle test bench or a part thereof, e.g. the steering force module or the drivetrain module, can be integrated in a mechanical module present on the complete vehicle or can be housed in a mobile or stationary cabinet or trolley outside the vehicle. This cabinet may be housed in the test chamber, but also in the control room, e.g. in a control cabinet or converter cabinet.

A pivoting device may advantageously be provided for the steering force module and/or the drivetrain module, which device makes it possible to pivot the steering force module and/or the drivetrain module away from the complete vehicle, preferably horizontally. For this purpose, the pivoting device is connected to the roadworthy complete vehicle and to the steering force module or the drivetrain module. The use of a pivoting device can be helpful e.g. for mounting and removing the roadworthy complete vehicle on or from the vehicle test bench, in particular if the pivoting device is designed such that no additional lifting or transporting apparatuses are necessary.

The steering wheel in the complete vehicle can be used directly by a real driver depending on the situation to exercise a steering force on the steering axle, e.g. when changing from an autonomous, i.e. electronics-controlled, driving operation to a manual driving operation.

Advantageously, a steering actuator is present which is connectable to a steering axle of the steering system and is designed to exert a steering force on the steering axle. In this case, the steering wheel would rotate freely therewith when a steering force acts. Very particularly advantageously, an engine present in the complete vehicle, for example a part of the power steering, serves as the steering actuator.

A simulation unit may be present on the vehicle test bench according to the invention, which unit is connected or connectable to the steering force modules, the drivetrain modules and, if present, the steering actuator, in order to provide them with values for transverse force, torque and optionally steering force. The simulation unit can also be connected to sensors, such as ultrasonic sensors, cameras, radars, GPS trackers, etc. of the roadworthy complete vehicle in order to also produce the simulation environment on the sensor side. This connection can take place by means of actuators which are controlled by the simulation unit and which apply external signals to the sensors, which is possible in the case of GPS or Ultrasonic sensors, for example. For certain sensors (e.g. cameras), however, such an application of signals is not possible in a simple manner. Therefore, electrical signals that are also provided by the simulation unit can be supplied in order to simulate the sensors. This can be done by disconnecting the existing sensors and connecting the simulation unit by means of suitable adapters to the connector to which the particular sensor was found to be connected. Alternatively, signals provided by the simulation unit can also be supplied to the bus after the sensor. Thus, the simulation module unit can also actuate the sensors of the roadworthy complete vehicle and simulate desired driving situations. However, an intervention of this kind with respect to the sensors is only permitted if the intervention can be reversed by mechanics, i.e. a subsequent inspection is not required. Of course, a connection of the simulation unit to a control unit of the roadworthy complete vehicle is also possible.

The vehicle test bench according to the invention can be used to provide an integration, calibration and test environment for driver assistance systems of a complete vehicle. Longitudinal dynamics and transverse dynamics can be calculated, analyzed and applied to the steering system or drivetrain independently of one other by the simulation unit. A validation of the integrated systems and functions in complex test scenarios is nevertheless possible in the form of a holistic overview. The higher dynamics achieved closes the gap between a hardware-in-the-loop (HiL) test that simulates the environment of the complete vehicle and a real road test in which the actual environment of the complete vehicle acts in the form of forces. It is thus possible to have a more efficient and more reproducible test operation of a fully integrated, autonomous complete vehicle, in particular if sensors and/or control units of the roadworthy complete vehicle are also connected to the simulation unit. The simulation model implemented on the simulation unit can also be integrated into an existing test bench control, or actuate it, for which purpose a corresponding signal interface for superordinate test bench automation may be required. The dynamics of the transverse force actuators and drive actuators not only allow the simulation of standard maneuvers of the complete vehicle but also fringe maneuvers, such as avoidance tests, emergency braking, off-road driving, etc. Maneuvers with maximum forces, such as a curb crossing, would also be conceivable. If a steering wheel actuator is present, this is of course also incorporated into the simulation model implemented on the simulation unit, e.g. into a subordinate driver model. The steering wheel actuator can also be connected to an external driving simulator on which a steering wheel having an actuator is constructed for operation by the real driver. The corresponding requirements for a real-time system are either integrated as a subsystem in the steering force module or integrated in the superordinate test bench control or the simulation unit. A corresponding signal interface can be provided for integrating the steering force module into the simulation model of the complete vehicle.

The vehicle test bench can of course also be operated in the form of simple control of the drive actuators and/or transverse actuators, without further simulation models. In addition, a vehicle model can be simulated or, as described above, the vehicle environment can be incorporated by the simulation model.

BRIEF DESCRIPTION OF THE DRAWINGS

The present invention is described in more detail in the following with reference to FIG. 1 to 2, which show exemplary, schematic and non-limiting advantageous embodiments of the invention. In the drawings.

DETAILED DESCRIPTION

Figure 1:
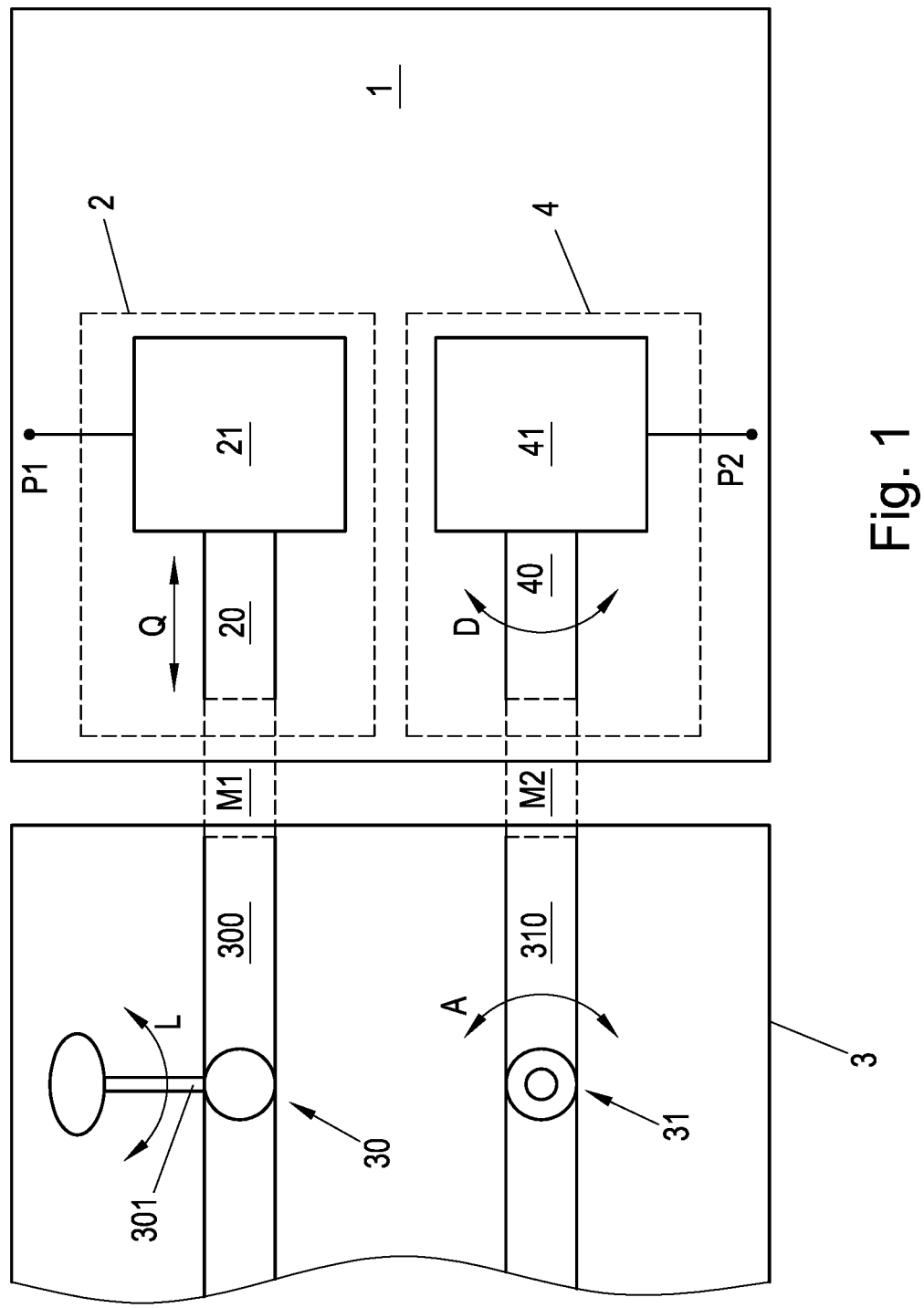
FIG. 1 shows a vehicle test bench which is connected to a roadworthy complete vehicle and comprises a steering force module and a drivetrain module.

FIG. 1 shows a vehicle test bench 1 comprising a steering force module 2 and a drivetrain module 4, and shows a roadworthy complete vehicle 3 (only shown schematically and in part). The steering force module 2 is characterized by a first stationary main body 21 and a transverse force actuator 20 that is displaceable relative thereto. A transverse force Q can thus be generated by means of a displacement of the transverse force actuator 20 relative to the first main body 21. For this purpose, it is necessary for the first main body 21 to be connected to a first fixed mounting point P1, which is located on the vehicle test bench 1 in this embodiment. In this case, it is advantageous to displaceably arrange the first mounting point P1 or the first main body 21 together with the transverse force actuator 20 in order to be able to orient them in a simple manner on different types of complete vehicles 3. Following the correct positioning of the first main body 21, this is fixed in place on the vehicle test bench 1. Alternatively, it would also be possible, for example, to select the first mounting point P1 on the roadworthy complete vehicle 3. The transverse force actuator 20 is connected by means of a first mechanical interface M1 to an unhooked tie rod 300 of the steering system 30 of the complete vehicle 3, by means of which the transverse force Q can be applied to the tie rod 300 and thus to the steering system 30 of the roadworthy complete vehicle 3.

The drivetrain module 4 comprises a second main body 41 and a drive actuator 40 that is rotatable relative thereto. In the same way, the second main body 41 is connected to a second fixed mounting point P2 on the vehicle test bench 1 or on the complete vehicle 3. The second main body 41 can also be capable of being positioned and fixed in place on the vehicle test bench 1. The drive actuator 40 is connected by means of a second mechanical interface M2 to a drive axle 310 of the drivetrain 31 of the roadworthy complete vehicle 3. The mechanical coupling can take place by means of known quick-action coupling systems. A torque D can thus be generated by rotation of the drive actuator 40 relative to the second main body 41 and can be transmitted to the drive axle 310 by means of the second mechanical interface M2. The torque D can thus be introduced independently of the transverse force Q.

Figure 2:
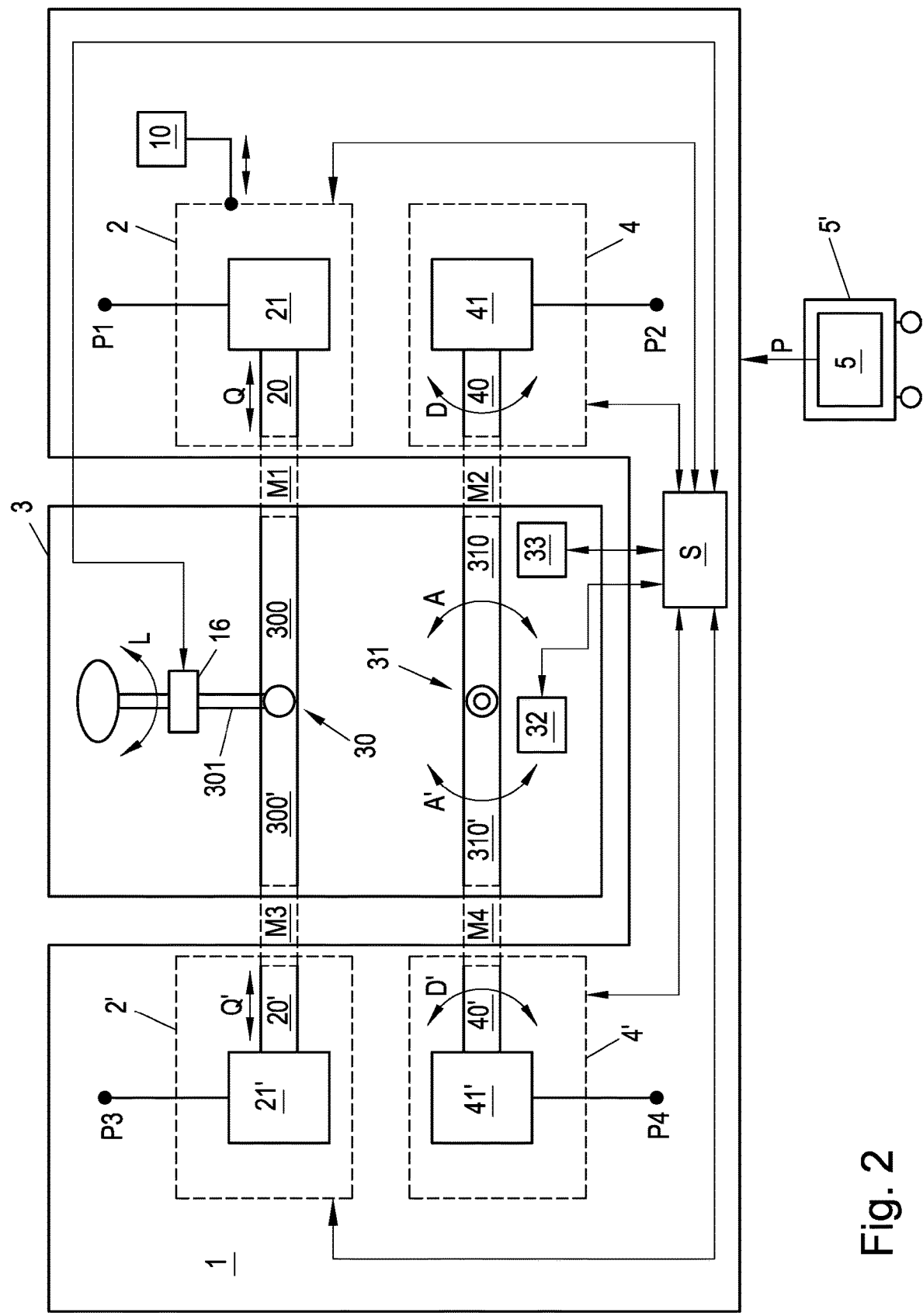
FIG. 2 shows a vehicle test bench which is connected to a roadworthy complete vehicle and comprises two steering force modules and two drivetrain modules.

A further embodiment can be found in FIG. 2, in which two steering force modules 2, 2' and two drivetrain modules 4, 4' are present in order to subject both sides of the complete vehicle 3 to a transverse force Q and/or a torque D. The first and the second steering force module 2 and 2', as well as the first and the second drivetrain module 4 and 4', are designed in the same way as the first steering force module 2 in FIG. 1: A further transversely displaceable transverse force actuator 20' is connected by means of a third mechanical interface M3 to the unhooked tie rod 300 of the steering system 30 of the roadworthy complete vehicle. A third main body 21' is connected to a third fixed mounting point P4, in this case once again connected to the roadworthy complete vehicle 3. A further transverse force Q' is generated by a displacement of the further transverse force actuator 20' relative to the third main body 21 and is applied to the steering system 30 by means of a third mechanical interface via the tie rod 300. The further drivetrain module 4 consists of a fourth main body 41' and a further axially rotatable drive actuator 40'. The further drive actuator 40' is connected to the further drive axle 310' of the drivetrain 31 of the roadworthy complete vehicle 3 by means of a fourth mechanical interface M4. The fourth main body 41' is in this case one again connected to the fourth fixed mounting point P4 located on the vehicle test bench. In this way, a further torque D' that is independent of the transverse force Q and the further transverse force Q' is generated by a displacement of the further drive actuator 40' relative to the fourth main body 41' and is applied to the further drive axle 40' of the drivetrain 31. The further torque D' can be independent of the torque D, or also dependent, or even identical. The further transverse force Q' can either be independent of or dependent on, or also identical to the transverse force Q.

The first, second, third and fourth mounting point P1, P2, P3, P4 are located on the test bench 1 itself in FIGS. 1 and 2. As mentioned, in addition only some or none of these mounting points P1, P2, P3, P4 may be located on the test bench 1. Alternatively, in addition some, all or none of these mounting points P1, P2, P3, P4 may be located on the roadworthy complete vehicle 3. What is essential is that the main bodies 21, 21', 41, 41' are anchored by means of the mounting points P1, P2, P3, P4 so as to be stationary with respect to the transverse movement and rotation, respectively, of the steering force actuators 21, 21' and drive actuators 40, 41.

FIG. 2 shows a preferably mobile cabinet 51 in which power electronics 5 which supply the vehicle test bench 1 with power P are housed. This cabinet can be housed at any desired location in the test chamber or in the control room, but also in a control cabinet or converter cabinet that is present. Alternatively, the power electronics (which could also supply steering force modules 2, 2' and/or drivetrain modules 4, 4' directly with power P) could also be integrated in a mechanical module present on the complete vehicle 3.

FIG. 2 also shows, on the side of the steering force module 2, a pivoting device 10 which is designed to pivot the steering force module 2 away from the complete vehicle 3. For this purpose, the pivoting device 10 is connected to the steering force module 2 and to the test bench 1. Of course, it would also be possible to design the pivoting device 10 to pivot the second steering force module 2' and/or the drivetrain module 4 and/or the second drivetrain module 4' away from the complete vehicle 3, the respective steering force modules 2, 2' or drivetrain modules 4, 4' of course having to be connected to the pivoting device 10. An installation of a plurality of pivoting devices 10 which are each designed to independently pivot individual or a plurality of steering force modules 2, 2' and/or drivetrain modules 4, 4' away from the complete vehicle 3 would also be possible. Pivoting the steering force modules 2, 2' or the drivetrain modules 4, 4' away from the complete vehicle 3 is of course only possible if the respective mechanical interfaces M1, M2, M3, M4 have been released. The complete vehicle 3 can thus be rapidly and simply removed from the vehicle test bench 1 after the respective steering force modules 2, 2' or drivetrain modules 4, 4' have been pivoted away, without comprehensive modifications to the vehicle test bench 1 being required. An introduction of the complete vehicle into the vehicle test bench 1 can also be facilitated in the same way by using pivoting devices 10.

FIGS. 1 and 2 also show a steering force L which is applied to a steering axle 301 and in turn acts on the tie rod 300. This steering force L can be applied to the steering axle 301 by a real driver via a steering wheel. In FIG. 2, however, a steering actuator 16, for example a steering robot, is used. Of course, an existing steering drive of the complete vehicle 3, for example for autonomous driving or a parking function, can also be used as the steering actuator 16.

In addition, FIG. 2 shows a simulation unit S which is connected to the steering force modules 2, 2' and to the drivetrain modules 4, 4' and provides them with target values for transverse force Q, Q' and torque D, D'. The simulation unit S is also connected to the steering actuator 16 and provides it with a steering force L. In the simulation unit S, a virtual journey with the complete vehicle can be simulated by a virtual environment. The loads occurring on the complete vehicle 3 in the process are converted into target values for transverse force Q, Q' and torque D, D', and optionally for the steering force L, and the complete vehicle 3 is subjected to these elements on the vehicle test bench 1 by means of a steering force module 2, 2' and/or drivetrain module 4, 4', and optionally the steering actuator 16. Any controllers, power electronics or drives required for this are not shown for the sake of clarity. The vehicle test bench 1 can thus be used to provide an integration, calibration and test environment for driver assistance systems of the complete vehicle 3. The target values for transverse force Q, Q' and torque D, D' and steering force L can be calculated in the simulation unit S itself or also supplied externally. For example, existing sensors 33 or control units 32 on the complete vehicle 3 may be used as an external source for these target values; a bus, e.g. a CAN bus, present in the complete vehicle 3 may also be considered. For this purpose, the simulation unit S in FIG. 2 is designed to be connectable to sensors 33 and to a control unit 32 of the complete vehicle 3.

The invention claimed is:

1. A vehicle test bench for applying forces and/or torques to a roadworthy complete vehicle, the vehicle having a steering system including an unhooked tie rod and a drivetrain including a drive axle, the vehicle test bench comprising:
 a first steering force module including
  a first main body configured to be mechanically connectable to a first fixed mounting point, and
  a first transverse force actuator displaceable relative to the first main body, the first transverse force actuator including a first mechanical interface configured to connect the first transverse force actuator to the unhooked tie rod of the steering system; and wherein a first transverse force is generated by a displacement of the first transverse force actuator relative to the first main body and is configured to be applied to the steering system;

the vehicle test bench further comprising a first drivetrain module including a second main body which is configured to be mechanically connectable to a second fixed mounting point, wherein the second main body is not mechanically connected to the first main body; and a first drive actuator which is configured to be rotatable relative to the second main body, the first drive actuator is rotationally fixable by means of a second mechanical interface to the drive axle of the drivetrain; and wherein a torque, independent of the first transverse force, is generated by a rotation of the first drive actuator relative to the second main body, and applied to the drive axle.

2. The vehicle test bench according to claim 1, further including:

a second steering force module including:

a third main body configured to be connectable to a third fixed mounting point; and a second transverse force actuator configured to be connectable, by means of a third mechanical interface, to the unhooked tie rod of the steering system, wherein a second transverse force is generated by a displacement of the second transverse force actuator relative to the third main body and is configured to be applied to the steering system.

3. The vehicle test bench according to claim 2, further including a second drivetrain module including:

a fourth main body configured to be connectable to a fourth fixed mounting point; and an axially rotatable drive actuator, the axially rotatable drive actuator being connectable by means of a fourth mechanical interface to the drivetrain, wherein a second torque that is independent of the first transverse force and the second transverse force is generated by a rotation of the axially rotatable drive actuator relative to the fourth main body, by means of which the second torque can be applied to the drivetrain.

4. The vehicle test bench according to claim 3, wherein at least one of the first fixed mounting point, the second fixed mounting point, the third fixed mounting point, and the fourth fixed mounting point is located on the test bench.

5. The vehicle test bench according claim 3, characterized in that at least one of the first fixed mounting point, the second fixed mounting point, the third fixed mounting point, and the fourth fixed mounting point is located on a chassis of the vehicle.

6. The vehicle test bench according to claim 3, characterized in that a pivoting device is configured to pivot at least one of the first and second steering force module and the first and second drivetrain modules away from the vehicle.

7. The vehicle test bench according to claim 2, further including a steering actuator configured to connect to a steering axle of the steering system, and to exert a steering force on the steering axle.

8. The vehicle test bench according to claim 7, wherein the steering actuator is a motor of the complete vehicle.

9. The vehicle test bench according to claim 1, characterized in that the first fixed mounting point is located on the vehicle, and the second fixed mounting point is located on the test bench.

10. A vehicle test bench for applying forces and/or torques to a roadworthy complete vehicle, the vehicle having a steering system including an unhooked tie rod and a drivetrain including a drive axle, the vehicle test bench comprising:

a first steering force module including a first main body configured to be mechanically connectable to a first fixed mounting point, and a first transverse force actuator displaceable relative to the first main body, the first transverse force actuator including a first mechanical interface configured to connect the first transverse force actuator to the unhooked tie rod of the steering system; and wherein a first transverse force is generated by a displacement of the first transverse force actuator relative to the first main body and is configured to be applied to the steering system;

a first drivetrain module including a second main body which is configured to be mechanically connectable to a second fixed mounting point; and a first drive actuator which is configured to be rotatable relative to the second main body, the first drive actuator is rotationally fixable by means of a second mechanical interface to the drive axle of the drivetrain; and wherein a torque, independent of the first transverse force, is generated by a rotation of the first drive actuator relative to the second main body, and applied to the drive axle;

a second steering force module including:

a third main body configured to be connectable to a third fixed mounting point; and a second transverse force actuator configured to be connectable, by means of a third mechanical interface, to the unhooked tie rod of the steering system, wherein a second transverse force is generated by a displacement of the second transverse force actuator relative to the third main body and is configured to be applied to the steering system;

a second drivetrain module including:

a fourth main body configured to be connectable to a fourth fixed mounting point; and an axially rotatable drive actuator, the axially rotatable drive actuator being connectable by means of a fourth mechanical interface to the drivetrain;

wherein a second torque that is independent of the first transverse force and the second transverse force is generated by a rotation of the axially rotatable drive actuator relative to the fourth main body, by means of which the second torque can be applied to the drivetrain; and a pivoting device is configured to pivot at least one of the first and second steering force module and the first and second drivetrain modules away from the complete vehicle.

11. The vehicle test bench according to claim 10, characterized in that the pivoting device is configured to horizontally pivot at least one of the first and second steering force modules and the first and second drivetrain modules away from the complete vehicle.

* * * * *